United States Patent
Banerjee et al.

(10) Patent No.: US 8,238,662 B2
(45) Date of Patent: Aug. 7, 2012

(54) METHOD FOR MANIPULATING REGIONS OF A DIGITAL IMAGE

(75) Inventors: Shymmon Banerjee, Calgary (CA); Wallace Kroeker, Calgary (CA); Erik Benner, Cochrane (CA); Andy Leung, Calgary (CA)

(73) Assignee: SMART Technologies ULC (CA)

( * ) Notice: Subject to any disclaimer, the term of this patent is extended or adjusted under 35 U.S.C. 154(b) by 940 days.

(21) Appl. No.: 11/779,006

(22) Filed: Jul. 17, 2007

(65) Prior Publication Data
US 2009/0022394 A1    Jan. 22, 2009

(51) Int. Cl.
G06K 9/00 (2006.01)
G06K 9/34 (2006.01)
(52) U.S. Cl. .................................. 382/181; 382/174
(58) Field of Classification Search .................. 382/164, 382/173, 181, 209, 217, 174; 345/156, 173
See application file for complete search history.

(56) References Cited

U.S. PATENT DOCUMENTS

| | | | |
|---|---|---|---|
| 5,523,775 A * | 6/1996 | Capps | 345/179 |
| 5,546,474 A * | 8/1996 | Zuniga | 382/176 |
| 5,583,946 A * | 12/1996 | Gourdol | 382/187 |
| 5,940,538 A * | 8/1999 | Spiegel et al. | 382/236 |
| 6,081,616 A * | 6/2000 | Vaezi et al. | 382/171 |
| 6,300,947 B1 | 10/2001 | Kanevsky | |
| 6,345,279 B1 | 2/2002 | Li et al. | |
| 6,473,522 B1 | 10/2002 | Lienhart et al. | |
| 6,720,965 B1 | 4/2004 | Hirosawa et al. | |
| 6,788,809 B1 * | 9/2004 | Grzeszczuk et al. | 382/154 |
| 7,203,901 B2 | 4/2007 | Chen et al. | |
| 7,308,112 B2 * | 12/2007 | Fujimura et al. | 382/103 |
| 2005/0052427 A1 * | 3/2005 | Wu et al. | 345/173 |
| 2005/0195221 A1 | 9/2005 | Berger et al. | |
| 2005/0210399 A1 | 9/2005 | Filner et al. | |
| 2006/0078162 A1 * | 4/2006 | Wonneberger | 382/103 |
| 2006/0274067 A1 | 12/2006 | Hidai | |
| 2006/0274928 A1 * | 12/2006 | Collins et al. | 382/132 |
| 2008/0146344 A1 * | 6/2008 | Rowe et al. | 463/42 |

FOREIGN PATENT DOCUMENTS

JP 2002192800 A * 7/2002
WO WO 2007000743 A2 * 1/2007

OTHER PUBLICATIONS

Ma et al. ("Edge Flow: A Framework of Boundary Detection and Image Segmentation," IEEE Proceedings of Conference on CVPR, 1997, pp. 744-749).*
Transmittal; International Search Report; and Written Opinion of the International Searching Authority for U.S. Patent Application No. PCT/CA2008/001311. Huanfeng MA et al.: "Bootstrapping structured page segmentation", Proceedings of the SPIE—The International Society for Optical Engineering SPIE—Int. Soc. Opt. Eng. USA, vol. 5010, 2003, pp. 179-188.
Marques F. et al.: "Partition-based image representation as basis for user-assisted segmentation", Image Processing, 2000. Proceedings. 2000 International Conference on Sep. 10-13, 2000, IEEE, Piscataway, NJ, USA, vol. 1, Sep. 10, 2000, pp. 312-315.
Supplementary European Search Report for European Patent Application No. 08 77 2887 with a date of completion of Jun. 14, 2011.

* cited by examiner

*Primary Examiner* — Yubin Hung
(74) *Attorney, Agent, or Firm* — Katten Muchin Rosenman LLP

(57) ABSTRACT

A method for dividing a digital image into regions comprises identifying potential region borders based on edge content in the digital image. The digital image is divided into regions based on user-selected ones of the potential region borders. A method of processing a region of a digital image comprises receiving gesture data for characterizing the region. A processing tool associated with the gesture data is automatically launched, and the region is processed using the processing tool.

26 Claims, 16 Drawing Sheets

Fig. 12

METHOD FOR MANIPULATING REGIONS OF A DIGITAL IMAGE

FIELD OF THE INVENTION

The present invention relates generally to image processing, and more particularly to a method and apparatus for manipulating regions of a digital image.

BACKGROUND OF THE INVENTION

In a newsroom or other broadcast environment, it is often desirable to transmit digital images taken from a variety of sources as part of a newscast, a sportscast, or for advertising. It is increasingly common for such transmitted digital images to include World Wide Web (WWW) pages or portions thereof that have been screen captured from the Internet using a personal computer, computer workstation or the like.

As is well known, a Web page often contains several visual and functional elements, including columns of text, advertisements, images, hyperlinks, live stock quote tickers, embedded programs, and the like. In the case where it is desired to broadcast a screen-captured image of a Web page for display on television screens, the image is typically manually edited prior to transmission. This is done to remove regions of the image that are not relevant to the subject-matter of the story, and/or to scale regions of the image such that they are more readable on the television screen once transmitted. For example, a newscaster may wish to draw the attention of a television audience to a particular quote on a particular Web page, but remove advertisements and other extraneous items.

It can be time-consuming to manually identify, isolate and manipulate regions in an image of a Web page. For this purpose, production staff typically employ an image cropping tool that is packaged with a set of editing tools as part of an image editing application (such as Microsoft™ Paint, for example). During image manipulation, image regions are manually copied from the original Web page image and pasted into a separate image for combining with other image elements. In order to ensure that the final image is attractive and useful, it is advantageous to identify and isolate image regions with pixel accuracy. To do so typically requires that production staff sequentially select regions and employ zoom-in, zoom-out, cropping and perhaps other digital image processing tools. Careful control of the pointer (i.e., mouse, stylus etc.) to identify the bounds of each selected image region in the digital image is required.

Techniques to crop images have been considered. For example, U.S. Pat. No. 6,337,925 to Cohen et al. discloses a method for determining borders of objects in a digital image in order to assist with masking of an object bound by the border. A user is required to choose an area of interest of the digital image that includes a portion of a border to be identified. The border portion is then modeled by estimating a position, direction and width of the edge zone of the border. Based on the modeled border portion, the border of an entire object in the scene is identified.

U.S. Pat. No. 6,593,944 to Nicolas et al. discloses a method and electronic system for modifying a Web page such that its content can be read by a user on an electronic device having a small screen. The method presupposes that the Web page is divided into frames, and arranges the Web page such that the frames can be displayed individually on the small screen. Each frame is scaled to the full size of the display.

Although manipulating digital images prior to transmission is often required as described above, in some instances it is also desired to manipulate broadcasted images. For example, during a live television broadcast, it is often desirable to have images available to the commentator for real-time display and further manipulation. In order to provide emphasis during a newscast, a commentator may wish to spotlight an image region that includes a popular quote. As another example, during a sportscast a commentator may wish to encircle an image region showing a goal being scored in a hockey game, then zoom in on the region to show the puck crossing the goal line.

In order to achieve real-time digital image processing, the commentator may employ a computer workstation directly, or some other user interface such as a touch system. Touch systems are well known in the art and typically include a touch screen having a touch surface on which contacts are made using a pointer in order to generate user input. The user input is then automatically conveyed to a computer executing one or more application programs. The computer uses the user input to update the image being presented on the touch screen, or to perform other actions via the application programs as though they were being operated using mouse and keyboard, for example. Many types of touch systems exist that utilize disparate technologies to identify contacts with the touch surface. These technologies include for example analog resistive, surface acoustic wave, capacitive, infrared, electromagnetic, laser-based and machine-vision detection arrangements to identify contacts with the touch surface.

In order to select a region and a processing tool (such as zoom-in, zoom-out, spotlight, highlight, or crop, as a few examples), the commentator typically pre-selects the processing tool application from a menu, picks up a pointer, and draws a border around the region of interest in the image displayed on the touch screen. The processing tool application running on the computer, which receives the user input, performs the desired processing action on the selected image region, and updates the image presented on the touch screen. Alternatively, the commentator may first select the region in the displayed image with the pointer and then select the desired processing tool application from a menu. Once selected, the processing tool application performs its processing action on the selected region, and the image presented on the touch screen is updated.

The manual selection of processing tools and identification of image regions can be time-consuming, particularly in the context of a live broadcast. This concern is addressed somewhat by application programs that permit users to first identify an image region and then select particular image processing tools using specific pointer gestures (such as an up-right motion indicating zoom, and a right-left motion indicating highlight). Other applications require receipt of a particular sequence of pointer gestures to perform various functions. For example, the video game Black & White, (developed by Lionhead Studios and published by Electronic Arts and Feral Interactive), allows players to cast spells and perform miracles by forming shapes using a sequence of mouse movements. The Web browser Opera enables a user to perform browsing gestures, as opposed to image processing operations, using small, quick mouse movements.

It is known to assign a different processing tool application to each of a set of pointers. With such an approach, the processing tool application associated with the selected pointer is automatically invoked when input is generated using that pointer. For example, a user may use a zoom pointer to identify an image region upon which zoom processing is to be conducted.

Although techniques to manipulate images prior to and after transmission are known as described above, improvements are desired. It is therefore an object of the present invention to provide a novel method and apparatus for dividing a digital image into regions for individual manipulation and for performing an image processing operation on a region in a digital image.

SUMMARY OF THE INVENTION

In accordance with one aspect, there is provided a method of dividing a digital image into regions, comprising:

identifying potential region borders based on edge content in the digital image; and dividing the digital image into regions based on user-selected ones of the identified potential region borders.

In one embodiment, the potential region borders are identified at locations along rows and columns in the digital image that have a significant amount of edge content. The identifying comprises calculating pixel intensity profiles for each row and column of pixels in the digital image. Adjacent ones of the pixel intensity profiles are compared to determine where differences between adjacent pixel intensity profiles exceed a threshold level, thereby establishing row and column positions of the potential region borders.

In accordance with another aspect, there is provided a method of processing a region of a digital image, comprising:

receiving gesture data for characterizing the region;

automatically launching a processing tool associated with the gesture data; and processing the region using the processing tool.

In accordance with another aspect, there is provided a computer readable medium embodying a computer program for dividing a digital image into regions, the computer program comprising:

computer program code identifying potential region borders based on edge content in the digital image; and computer program code dividing the digital image into regions based on user-selected ones of the identified potential region borders.

In accordance with yet another aspect, there is provided a computer readable medium embodying a computer program for processing a region of a digital image, the computer program comprising:

computer program code receiving gesture data for characterizing the region;

computer program code automatically launching a processing tool associated with the gesture data; and computer program code processing the region using the processing tool.

In accordance with another aspect, there is provided an interactive display system comprising:

a touch screen that defines a touch surface on which a computer-generated image is presented;

a sensor assembly detecting pointer contacts on the touch surface and in response, generating gesture data for characterizing a region of the computer-generated image; and processing structure receiving the gesture data and automatically launching a processing tool associated with the gesture data for processing the region.

The above method for dividing a digital image into regions is beneficial as it provides for the accurate identification and manipulation of image regions during editing of the digital image. A user is able to select from pre-defined region borders to divide the image into regions and is thereby not necessarily required to laboriously define the image regions manually. As such, time spent by a user defining image regions and editing the image using the image regions, particularly for digital images having certain types of content (i.e. Web pages), is significantly reduced.

The method for processing a region of a digital image is beneficial as it provides for the accurate identification and processing of image regions, particularly during live broadcasting of the images. A user is able to identify both a region of interest, and the processing tool for processing the region, with a single gesture. As such, time spent by a user identifying the image region and selecting a processing tool is significantly reduced.

BRIEF DESCRIPTION OF THE DRAWINGS

Embodiments will now be described more fully with reference to the accompanying drawings, in which:

FIG. 5 is the grayscale Web page image of FIG. 4, showing thresholded column and row intensity profiles to identify locations of reference lines;

FIG. 6 shows the identified reference lines overlaid on the captured Web page image;

FIG. 12 shows the undiscarded image regions of the Web page image of FIG. 10 having been manipulated to form a complete, simplified Web page image;

DETAILED DESCRIPTION OF THE EMBODIMENTS

In the following description, methods, apparatuses and computer readable media embodying computer programs for dividing a digital image into regions and processing a region of a digital image are disclosed. The methods and apparatuses may be embodied in a software application comprising computer executable instructions executed by a processing unit including but not limited to a personal computer, interactive display or touch system, a digital image or video capture device such as for example a digital camera, camcorder or electronic device with video capabilities, or other computing system environment. The software application may run as a stand-alone digital image tool, an embedded function or may be incorporated into other available digital image applications to provide enhanced functionality to those digital image applications. The software application may comprise program modules including routines, programs, object components, data structures etc. and may be embodied as computer readable program code stored on a computer readable medium. The computer readable medium is any data storage device that can store data, which can thereafter be read by a computer system. Examples of computer readable media include for example read-only memory, random-access memory, CD-ROMs, magnetic tape and optical data storage devices. The computer readable program code can also be distributed over a network including coupled computer systems so that the computer readable program code is stored and executed in a distributed fashion. Embodiments will now be described with reference to FIGS. 1 to 15.

Figure 1:
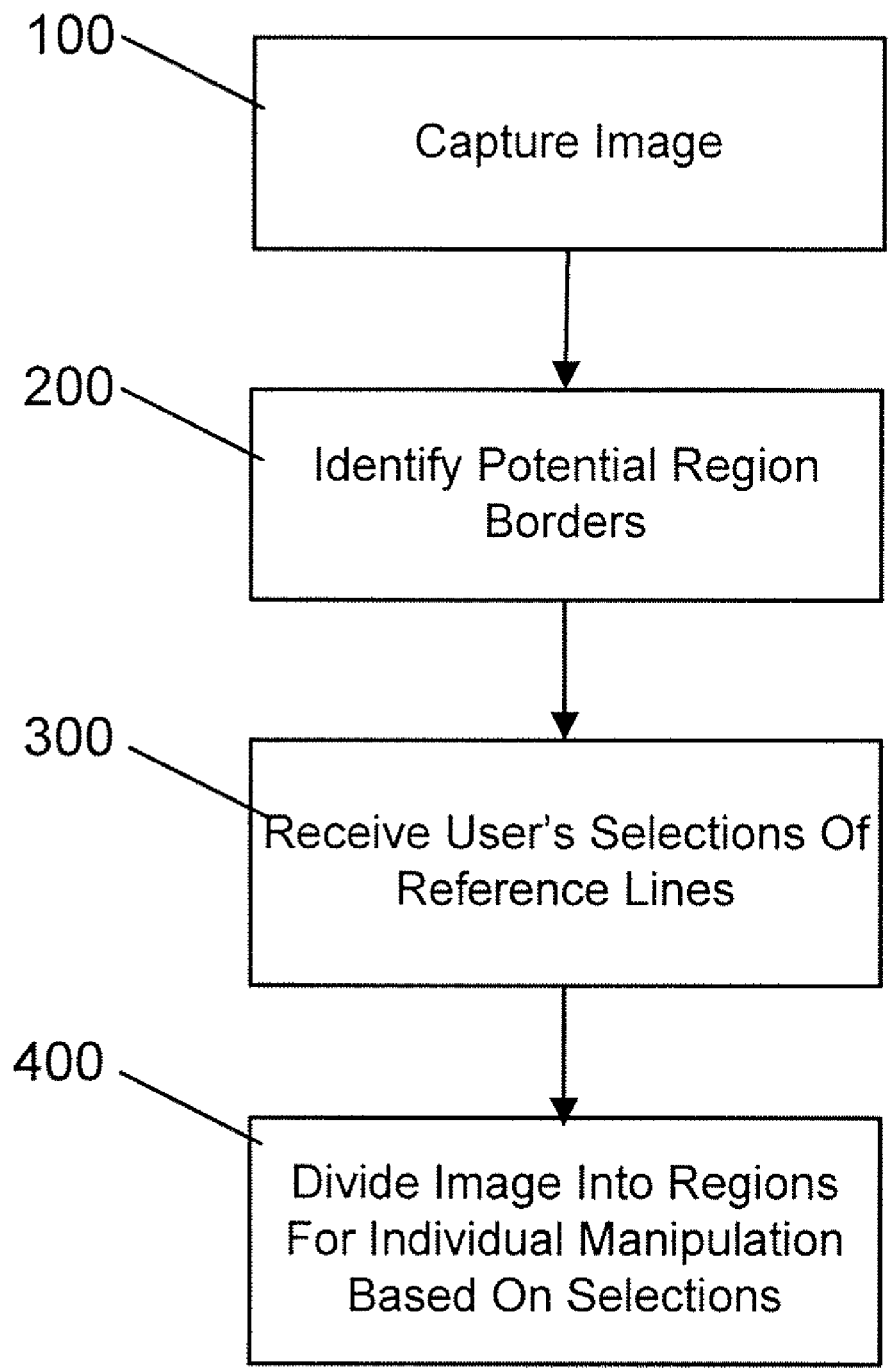
FIG. 1 is a flowchart showing steps for dividing a digital image into regions.

Turning now to FIG. 1, a method of dividing a digital image into regions is shown. During the method, the digital image is captured (step 100) as a computer screenshot or using an image capture device (such as a digital camera, for example). Potential or candidate region borders within the digital image are then identified as reference lines (step 200), and user selected reference lines are determined (step 300). Based on the selected reference lines, the captured image is divided into regions (step 400) for further manipulation by the user.

Figure 2:
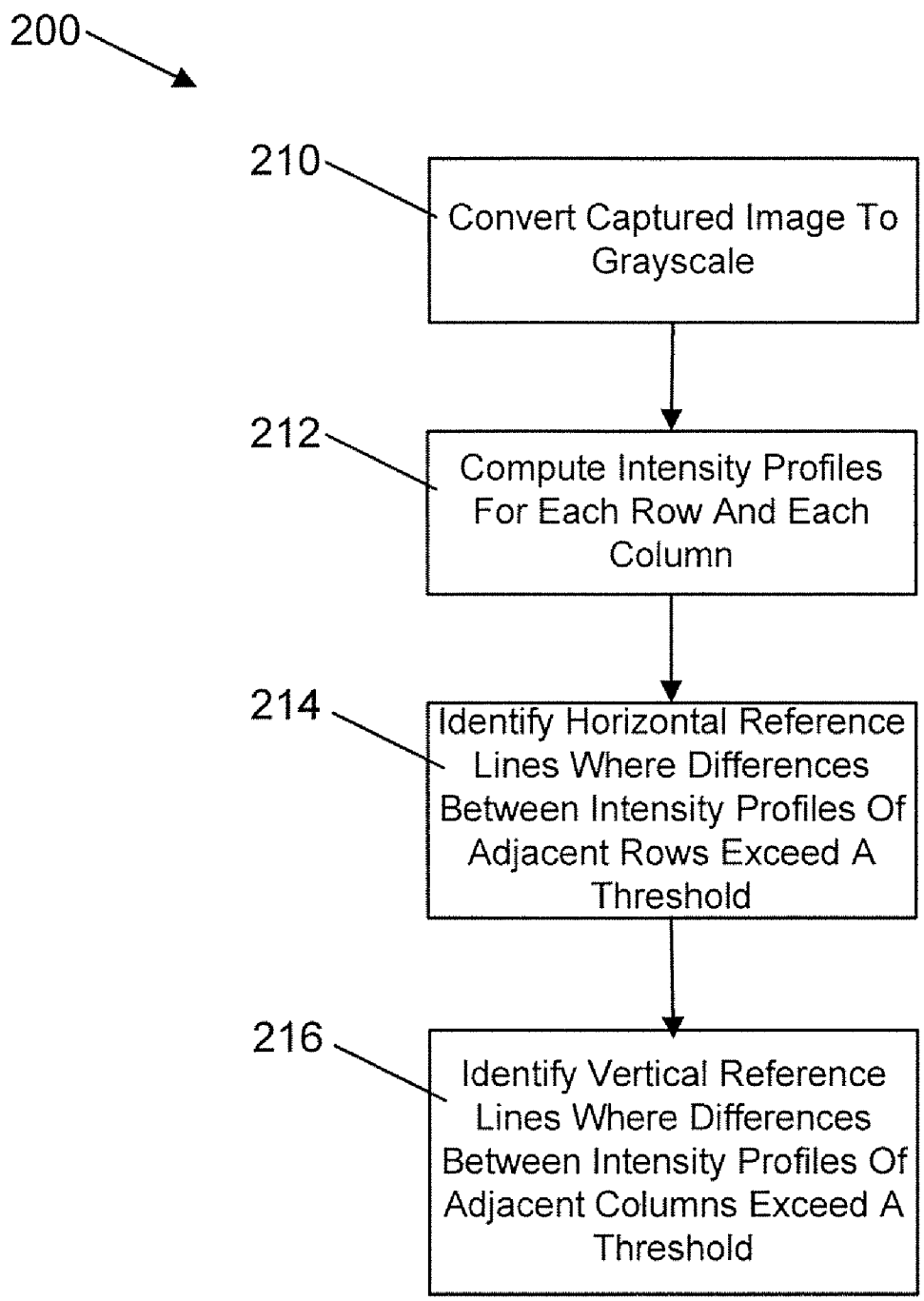
FIG. 2 is a flowchart showing the steps performed during identification of potential region borders in the digital image.

The steps for identifying potential region borders (step 200) are shown in FIG. 2. First, a grayscale image is created by extracting the pixel luminance channel from the captured image (step 210). Intensity profiles are then computed for each row and column of the grayscale image (step 212). During computation of the intensity profiles, the luminance values of the pixels in each row of the grayscale image are averaged thereby yielding, for each row, an intensity profile that is the average luminance of all pixels in the row. The same is performed for the columns of the grayscale image.

After computation of the intensity profiles, the intensity profiles for the rows are thresholded to identify the locations of significant horizontal edges in the grayscale image, as set forth in the following pseudo code:

```
If | IntensityProfile(row (i−1)) − Intensity Profile(row(i)) | >= Threshold
    IntensityProfile(row(i)) = 1
Else
    IntensityProfile(row(i)) = 0
End If
```

A fixed threshold value of 0.125 intensity units has been found to be suitable. An adaptive threshold value or one obtained based on a measurement of intensity volatility in the grayscale image (i.e. standard deviation of intensity, for example) may of course be employed.

The intensity profiles for the columns are then thresholded in a manner similar to that described above for the rows.

With the intensity profiles thresholded, the positions of intensity profiles having a designation of "1" correspond to positions of region borders or reference lines in the captured image. Accordingly, horizontal reference lines are identified in the captured image at rows having an intensity profile=1 (step 214), and vertical reference lines are identified in the captured image at columns having an intensity profile=1 (step 216). Each horizontal reference line spans the entire width of the captured image, and each vertical reference line spans the entire height of the captured image.

Figure 3:
FIG. 3 is a captured image of a Web page.
Figure 4:
FIG. 4 is a grayscale image of the Web page of FIG. 3, showing computed column and row intensity profiles.
Figure 6:
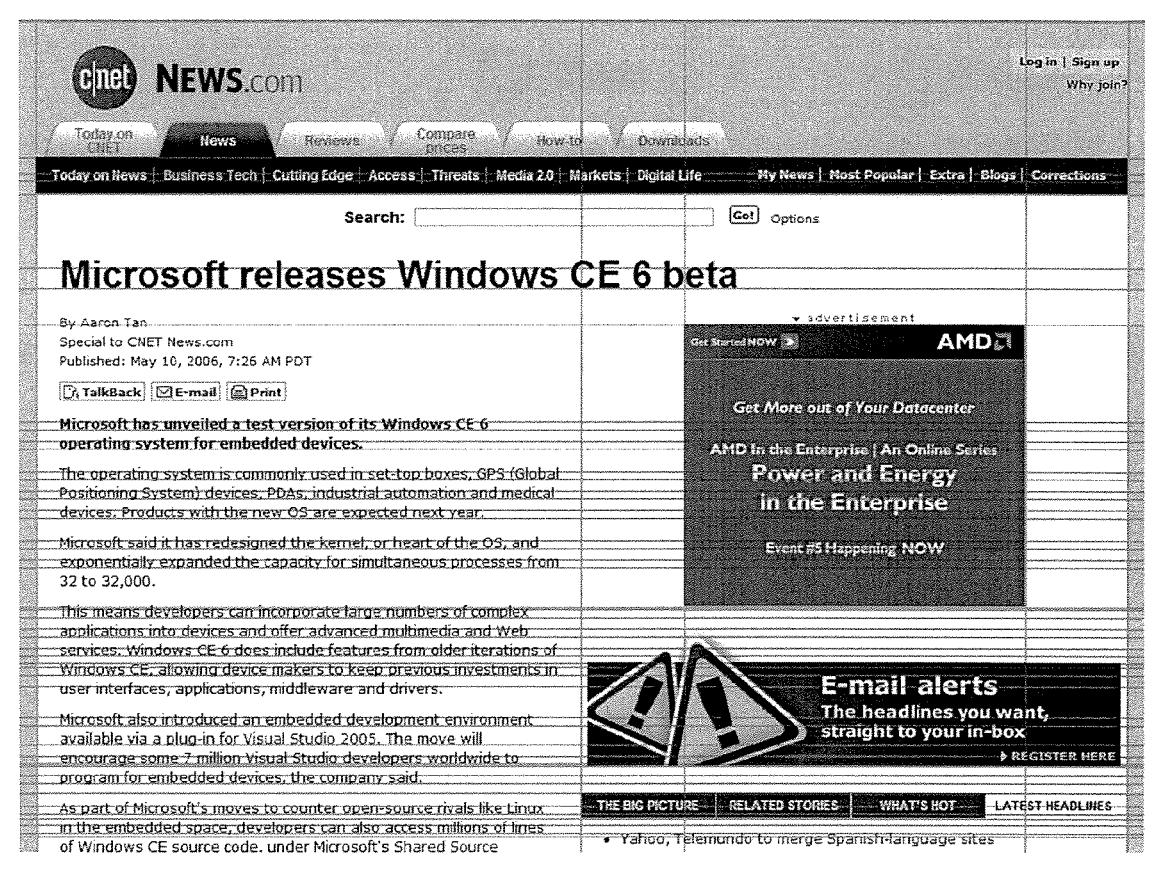

FIGS. 3 to 6 show processing of a Web page image according to the steps described above. More particularly, FIG. 3 shows a captured Web page image as it would appear to a user. FIG. 4 shows the corresponding grayscale image and the computed column and row intensity profiles. It will be understood that, while intensity profiles are visible in FIG. 4, this is for ease of understanding. It is not necessary for the intensity profiles to be displayed. FIG. 5 illustrates the column and row intensity profiles of the grayscale image having been thresholded to identify the vertical and horizontal reference lines. FIG. 6 shows the reference lines overlaid on the captured Web page image. It will be understood that, while the reference lines are visible in FIG. 6, this is for ease of understanding. As will be described in further detail below, according to this embodiment it is not necessary at this point for users to see them displayed onscreen simultaneously.

Figure 7:
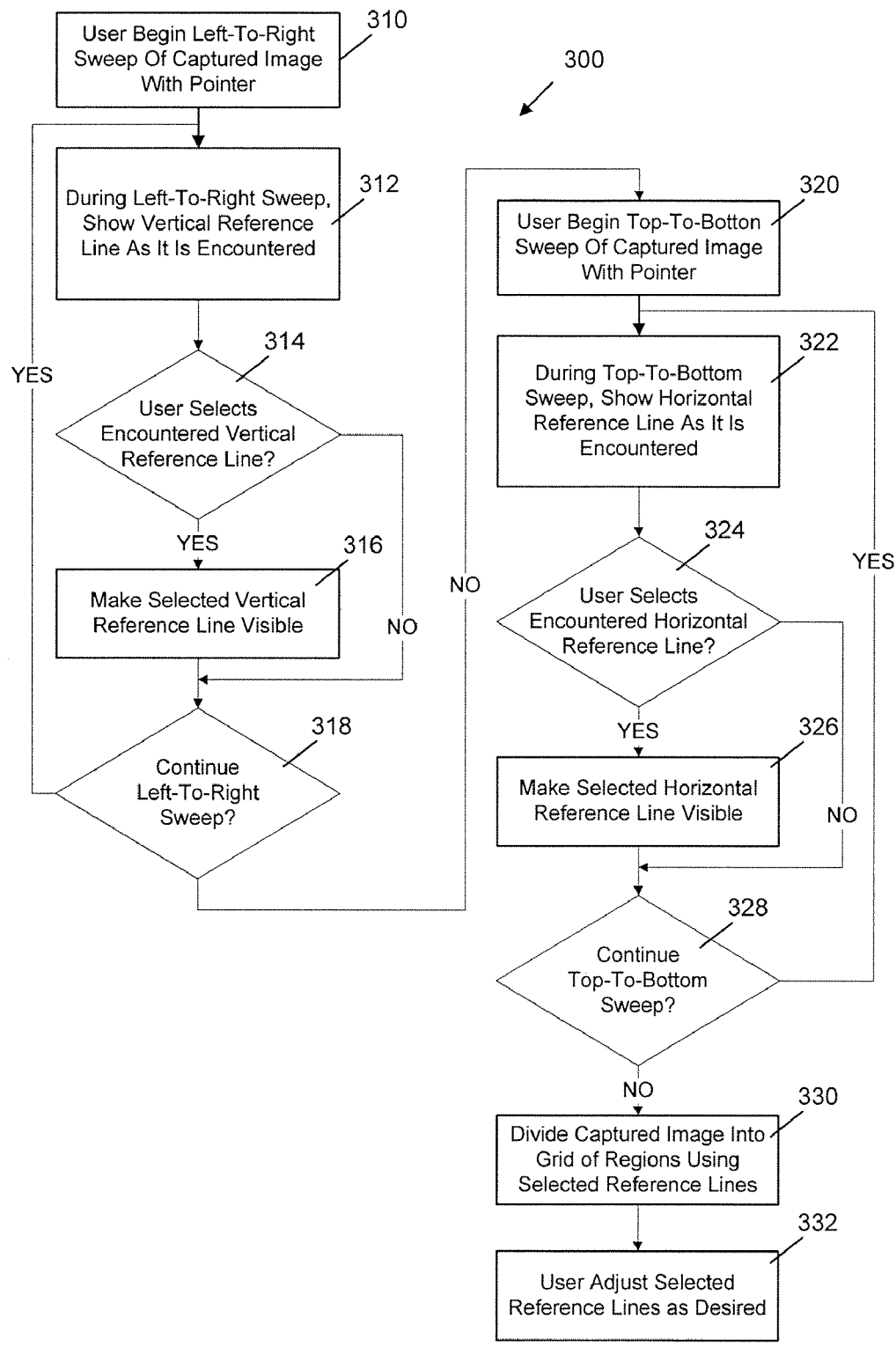
FIG. 7 is a flowchart showing steps for selecting and manipulating reference lines.

With the horizontal and vertical reference lines identified, the user is able to select reference lines in order to divide the captured image into regions for individual manipulation (step 300). The steps performed during reference line selection are shown in FIG. 7, as described below.

In order to view and select vertical reference lines, a vertical sweep tool is invoked. Once invoked, the user begins a left-to-right sweep of the captured image with the pointer (step 310). During the left-to-right sweep, the vertical reference lines are made visible to the user as they are "encountered" by the pointer (step 312). More particularly, a vertical reference line appears on the display when the x-position of the pointer is determined to match or at least be within a predetermined distance of the x-coordinate of that vertical reference line. The vertical reference line remains visible as the user continues to sweep the pointer past the x-coordinate of the vertical reference line and disappears when the actual x-coordinate of the pointer exceeds the vertical reference line x-coordinate by a threshold amount (i.e. 10 pixels, for example). This facility eases selection by the user of the vertical reference line. Furthermore, where the display includes a pointer icon (i.e., an arrow), the arrow "sticks" to the vertical reference line. This "sticking" effect also assists the user with identifying and selecting the vertical reference line. If a visible reference line is to be selected, the user simply needs to temporarily halt the sweep and click the mouse button to select the vertical reference line that has been made temporarily visible.

After the user selects the vertical reference line (step 314), the vertical reference line is toggled "ON" and remains permanently visible, despite the pointer's position (step 316). If the user desires to continue the left-to-right sweep to select additional vertical reference lines (step 318), then the method continues from step 312. While the vertical sweep tool is selected, the user is able to go back and re-sweep to select further vertical reference lines that had previously been missed.

In order to view and select horizontal reference lines, the user invokes a horizontal sweep tool and begins a top-to-bottom sweep of the captured image with the pointer (step 320) to encounter and select from horizontal reference lines. The top-to-bottom sweep and selection of horizontal reference lines is conducted in a similar manner to that described above with respect to vertical reference lines. Once the user has completed the top-to-bottom sweep, each selected horizontal reference line is toggled "ON" and remains visible, despite the pointer's position. While the horizontal sweep tool is selected, the user is able to go back and re-sweep to select further horizontal references lines that had previously been missed.

Should the user desire, a selected reference line can be deselected and thereby toggled "OFF" to render it invisible again.

Once the horizontal and vertical reference lines have been selected, the captured image is divided into a grid of regions, delineated by the selected reference lines (step 330). The user can then adjust the selected reference lines to fine-tune their positions as desired (step 332). For example, one of the horizontal reference lines in FIG. 6 runs through the Headline "Microsoft Releases Windows CE 6 beta". If this horizontal reference line, once selected, were not adjusted, the Headline would be undesirably cropped. Thus, the user adjusts the selected reference line as if resizing a tiled window. FIGS. 9 to 12 show the selected reference line having been adjusted to ensure that the Headline is not undesirably cropped. The reference lines are divided automatically into segments based on intersection points of horizontal and vertical reference lines, and the user can selectively adjust individual segments of the reference lines thereby to adjust the borders of individual image regions.

Once the captured image has been divided into the desired image regions by the adjusted reference lines, the user can select individual image regions for further manipulation. For example, the user may wish to discard some image regions and reposition and/or resize other image regions. An image region may be discarded by selecting the image region using the pointer and pressing the "delete" key on a keyboard, for example. Once selected image regions have been discarded, size adjustment of the remaining image regions can be performed by selecting with a pointer a horizontal or vertical region border and dragging it using the pointer through empty space (i.e. where discarded image regions were once positioned) to the closest border of the next undiscarded image region. If the selected border is dragged so as to overlap the next undiscarded image region, it is "snapped" into alignment with the closest border of that undiscarded image region. As such, the image region is made to neatly align with the next undiscarded image region. For vertical image region borders, the "snapping" functionality is facilitated by detecting when the x-coordinate of the selected image region border while being dragged becomes equal to or greater than the x-coordinate of the facing image region border of the next undiscarded image region. Upon release the x-coordinate of the selected image region border is re-set to be equal to the x-coordinate of the facing image region border. The same is done with horizontal borders by detecting and re-setting y-coordinates in a similar manner.

Upon "snapping" of the selected image region border into alignment with the closest border, the now-adjacent image regions may be, as desired, merged as a single region. Alternatively, the aligned borders themselves may be merged as a single border such that adjustment of the single border enlarges one of the two adjacent image regions and diminishes the other.

Figure 8:
FIG. 8 shows the captured Web page image of FIG. 3 from a user's point of view, in which a vertical sweep tool for selecting from the identified reference lines is invoked.
Figure 9:
FIG. 9 shows the captured Web page image of FIG. 8 after vertical and horizontal sweeps for selecting reference lines has been completed.
Figure 10:
FIG. 10 shows the captured Web page image of FIG. 8 after a subset of image regions have been discarded.
Figure 11:
FIG. 11 shows degrees of freedom for manipulating the sizes of undiscarded image regions of the Web page image of FIG. 10.

FIGS. 8 to 12 show processing of the captured Web page of FIG. 3 according to the above steps when a user selects from the set of reference lines to identify image regions. More particularly, FIG. 8 shows the Web page image from a user's point of view, in which the vertical sweep tool for selecting reference lines has been invoked. FIG. 9 shows the Web page image after vertical and horizontal sweeps for selecting reference lines is complete. FIG. 10 shows the Web page image after a user has discarded a subset of the image regions. FIG. 11 shows undiscarded image regions of the Web page image of FIG. 10 being manipulated thereby to adjust their respective sizes.

FIG. 12 shows the undiscarded image regions of the Web page image of FIG. 10 having been manipulated as described above to form a complete, simplified Web page image suitable for broadcasting.

Although manipulating digital images prior to transmission is often required as described above, in some instances it is also desired to spotlight, zoom-in on, or otherwise manipulate regions of digital images during, for example, a live television broadcast. Manipulation of a digital image during a live television broadcast may be performed using an interactive display, or touch system 50 such as that shown in FIG. 13. The touch system is similar to that described in U.S. patent application Ser. No. 11/331,448, assigned to SMART Technologies Inc., assignee of the subject application, the content of which is incorporated herein by reference in its entirety. As can be seen, touch system 50 includes a touch screen 52 having a touch surface 54 defining a region of interest on which pointer contacts are to be made using pointer 70. In this embodiment, pointer 70 has a body 72 and a tip 74, and the touch screen 52 is the generally planar surface of a flat panel display device such as for example an LCD, plasma, HDTV or other television display device. A sensor assembly 56 extends along one side of the touch screen 52. The sensor assembly 56 includes a valence 58 secured to one side edge of the touch screen 52. Digital cameras 60 are positioned adjacent opposite ends of the valence 58. The fields of view of the digital cameras 60 overlap over the entire active area of the touch surface 54 so that pointer contacts made on the touch surface 54 can be visually detected.

An infrared (IR) receiver 62 is positioned adjacent to and communicates with an associated digital camera 60. Each IR receiver 62 is similar to those found on consumer electronics and comprises a lensed IR detector coupled to a gain controlled amplifier. The digital cameras 60 are coupled to a computer 64 or other suitable processing device via a USB hub 65 and high speed data bus 66 such as for example USB-2. Computer 64 includes memory and a processor that executes one or more application programs and provides display output that is made visible on the touch screen 52. The touch screen 52, computer 64 and display device form a closed-loop so that pointer contacts with the touch screen 52 can be recorded as writing or drawing, and/or as gestures used to control execution of application programs executed by the computer 64.

Figure 13:
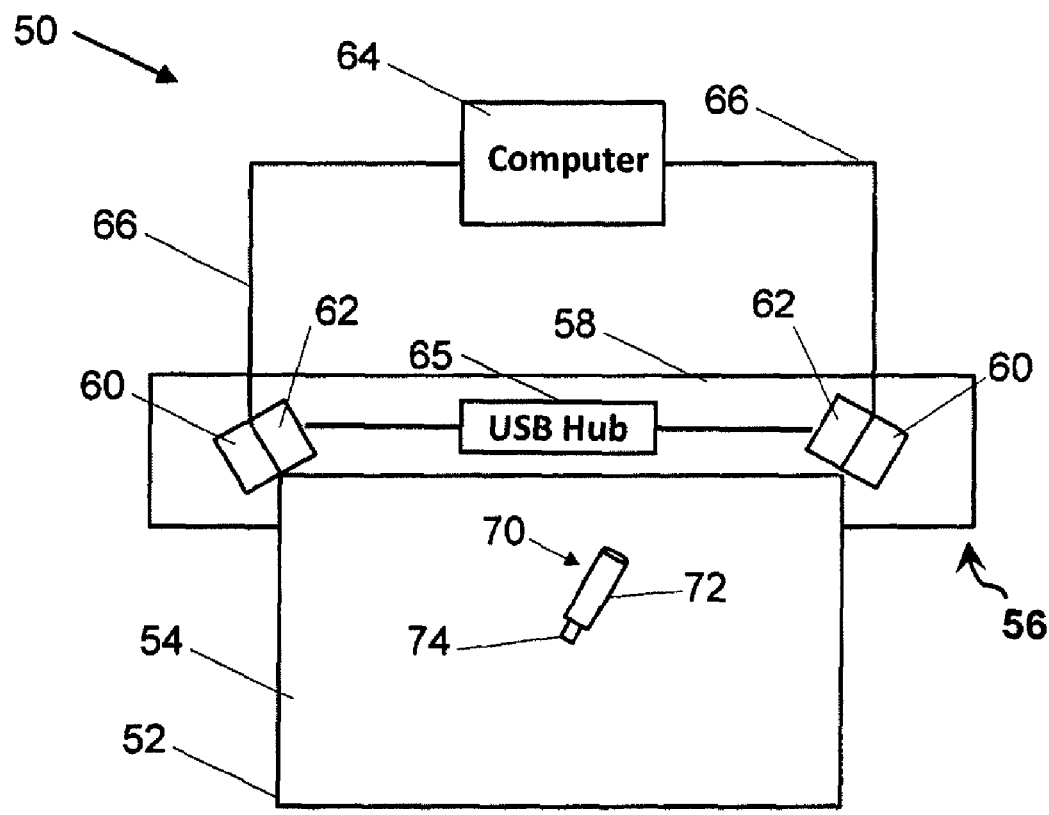
FIG. 13 is a front plan view of a touch system.
Figure 14:
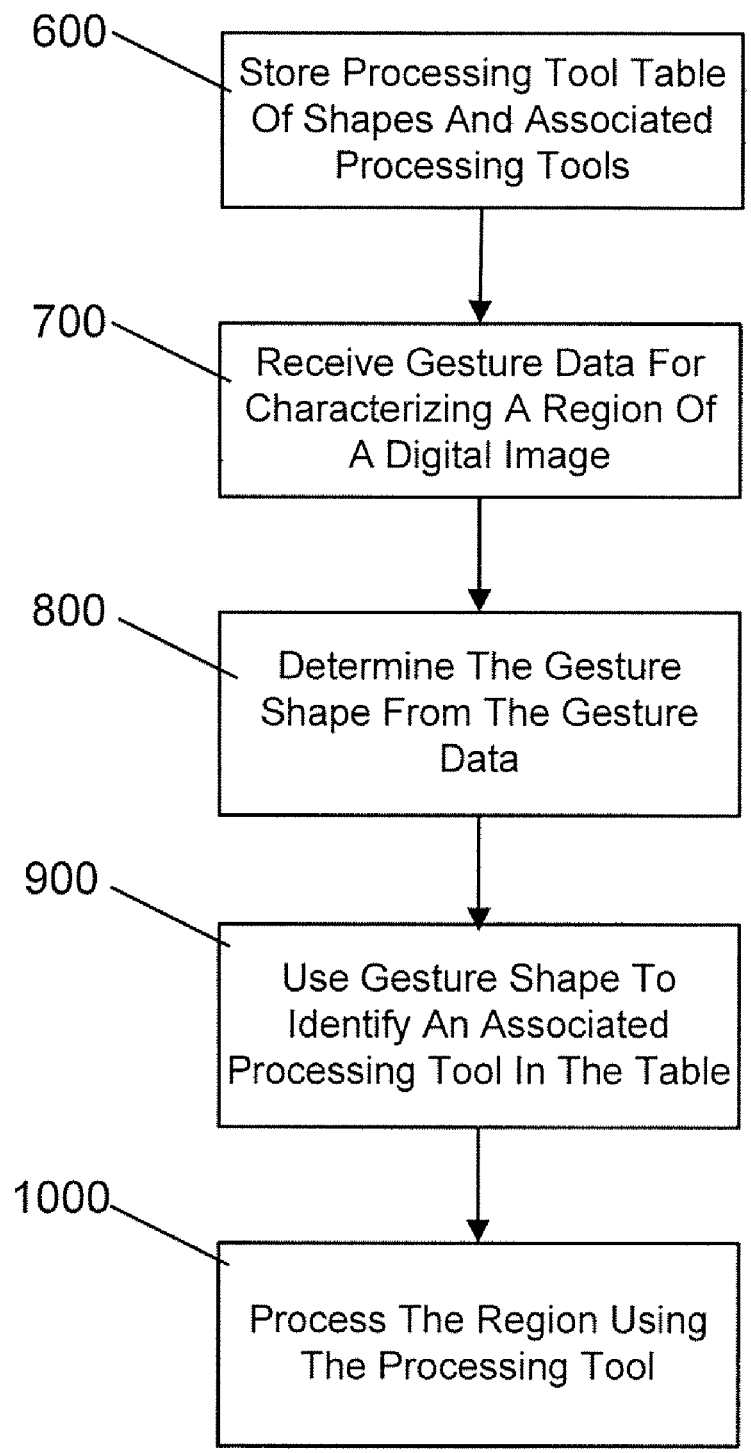
FIG. 14 is a flowchart showing steps for processing a region of a digital image using the touch system.

FIG. 14 is a flowchart showing steps for selecting and processing an identified region of a digital image during a live television broadcast with the touch system of FIG. 13. A software-accessible processing tool table or tables associating shapes of gestures with processing tools is stored in memory of computer 64 (step 600). An example of the conceptual contents of the processing tool table is shown in Table 1 below.

TABLE 1

| Gesture | Processing Tool |
| --- | --- |
| "O" | Spotlight (Spotlight region characterized by size and position of "O" shaped gesture) |
| "☐" | Zoom (Zoom in/out on region characterized by size |

TABLE 1-continued

| Gesture | Processing Tool |
|---|---|
|  | and position of "□" shaped gesture) |

In Table 1, an elliptical-shaped gesture is associated with a "Spotlight" processing tool that brightens an identified region relative to its surroundings. Similarly, a rectangular-shaped gesture is associated with a "Zoom" processing tool.

When the user gestures on the touch screen 52 to identify a region of the displayed digital image, gesture data is received by computer 64 (step 700), and gesture ink is displayed on the display device in a known manner based on the received gesture data. The gesture data is a set of sampled coordinates based on pointer contacts that in combination form a closed figure such as an ellipse, a rectangle, a triangle etc. Individual sampled coordinates are considered part of a set if together received while the pointer remains in contact with the touch surface 54. Other similar criteria may be used. In this embodiment, the gesture data directly characterizes the identified region because it defines the shape, size and position of the region.

Once the gesture data is received, the shape of the gesture is determined (step 800) by the computer 64 using a shape recognition algorithm. The gesture shape, as described above, is considered a closed figure (i.e. one of a rectangle, ellipse, triangle etc.). Error handling algorithms may be employed by computer 64 to handle cases in which the gesture data cannot reasonably be considered to define a closed figure (i.e. a straight or only slightly curved line). Other pre-processing algorithms may be employed by computer 64 to handle cases in which the gesture data, while not inherently defining a closed figure, may reasonably be considered to represent a closed figure. For example, a "C" shape or swirl may each be considered as imprecisely-drawn ellipses. It is advantageous, from a user's perspective, for the shape recognition algorithm to be robust so as to handle such partially-closed figures. In order to achieve this, the pre-processing algorithms process the set of sampled points and perhaps add additional points to the set to result in a closed figure that completely encloses the region being delineated.

Shape recognition algorithms are known in the art, and include those that compare the characteristics of a set of sampled coordinates to predefined characteristics respectively defining shapes or shape templates. For example, if a set of coordinates is a 93% match with a given shape template but only a 22% match with another shape template, then the shape template with the 93% match is chosen as the matching gesture template, thereby to determine the gesture shape.

Once the gesture shape is determined, the original gesture ink on the display device is removed and replaced with gesture ink corresponding to the determined gesture shape scaled and positioned so as to correspond to the size and position of the user's original gesture. The size and position of the gesture are determined by processing the set of sampled points using geometrical analysis to determine a center of the gesture and its boundaries.

The gesture shape is then used by the computer 64 as a key into the index of the processing tool table to identify the associated processing tool. In Table 1, for example, should the gesture shape be determined to be an ellipse "O", the Spotlight processing tool is identified.

The identified processing tool is then automatically launched and both the digital image and the gesture data are provided as input arguments to the processing tool for processing the region (step 1000). Processing tool input arguments may include the gesture data itself, or the determined gesture shape with corresponding size and position information. Depending upon the processing tool with which the gesture shape is associated in the processing tool table, processing may occur automatically, or alternatively an option given to the user to specify further the nature of the processing. For example, if the processing tool is a zoom tool, the user is given the option of zooming in, zooming out, or doing nothing. Furthermore, the user is able to translate the zoom tool so as to process a region having the same shape and size as was drawn but at a different position. Once used, the processing tool is closed or otherwise de-activated by clicking the mouse or contacting the touch surface 54 outside of the region delineated by the gesture ink.

Figure 15A:
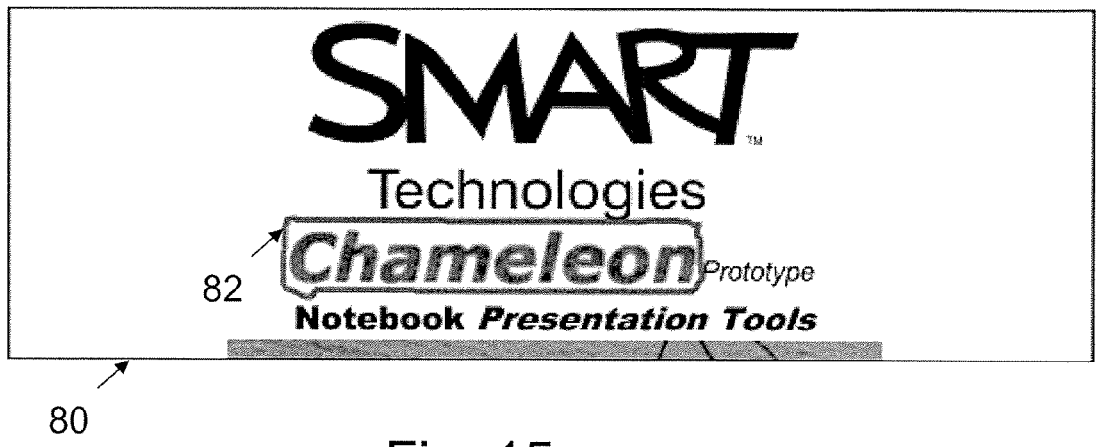
FIG. 15a shows a region of a digital image delineated by a generally rectangular boundary drawn on a touch surface of the touch system.
Figure 15B:
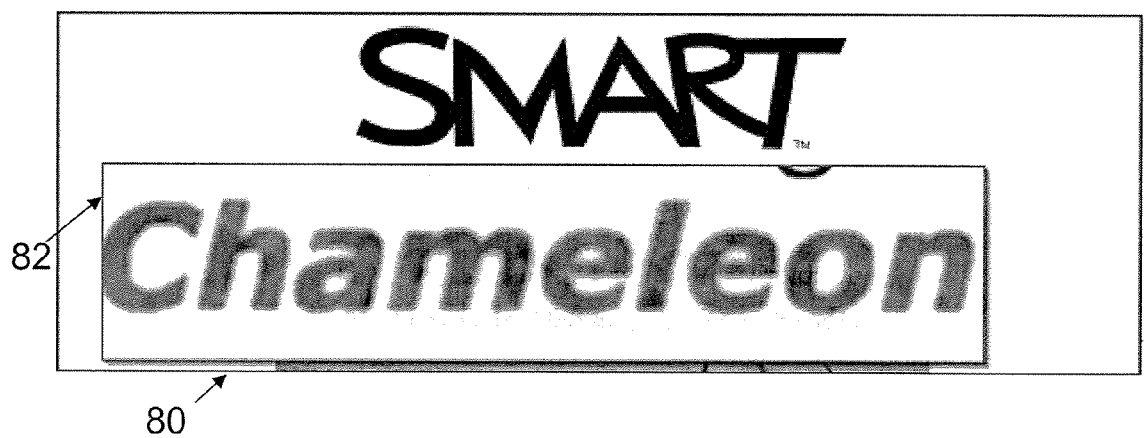
FIG. 15b shows the delineated region of the digital image of FIG. 15a enlarged by application of a zoom tool associated with the drawn rectangular boundary.

A region 82 of a digital image 80 delineated by a generally rectangular boundary drawn using the touch system 50 is shown in FIG. 15*a*. The identified region 82 of digital image 80 enlarged by application of a zoom processing tool associated with the gestured rectangular boundary is shown in FIG. 15*b*. The original gesture ink of FIG. 15*a* is automatically removed and, as shown in FIG. 15*b*, is replaced with gesture ink identifying the bounds of the rectangular region 82 that was enlarged by the zoom processing tool.

Figure 16A:
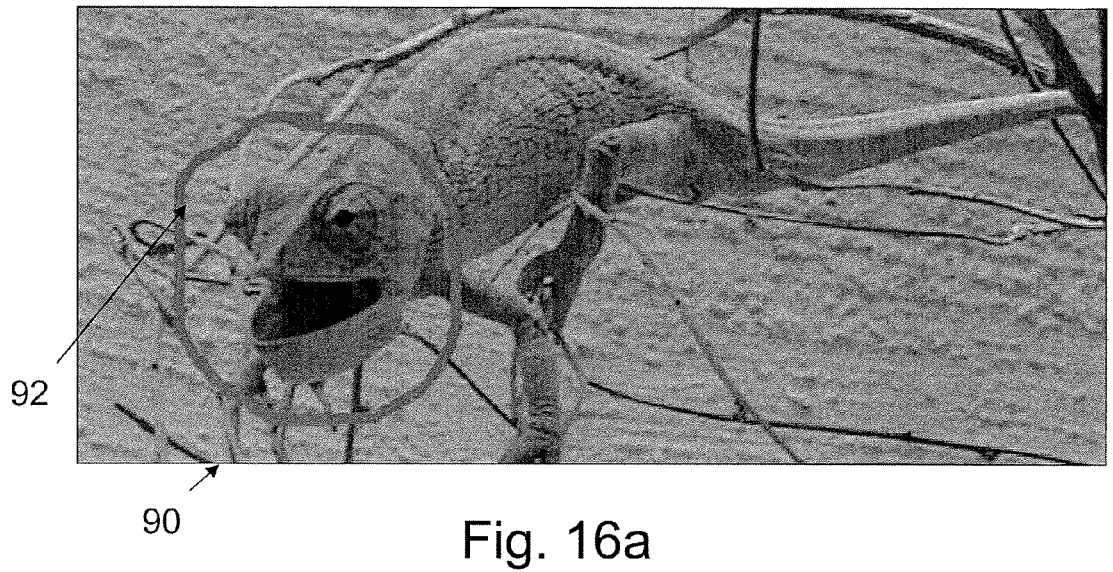
FIG. 16a shows a region of another digital image delineated by a generally circular boundary drawn on the touch surface of the touch system.
Figure 16B:
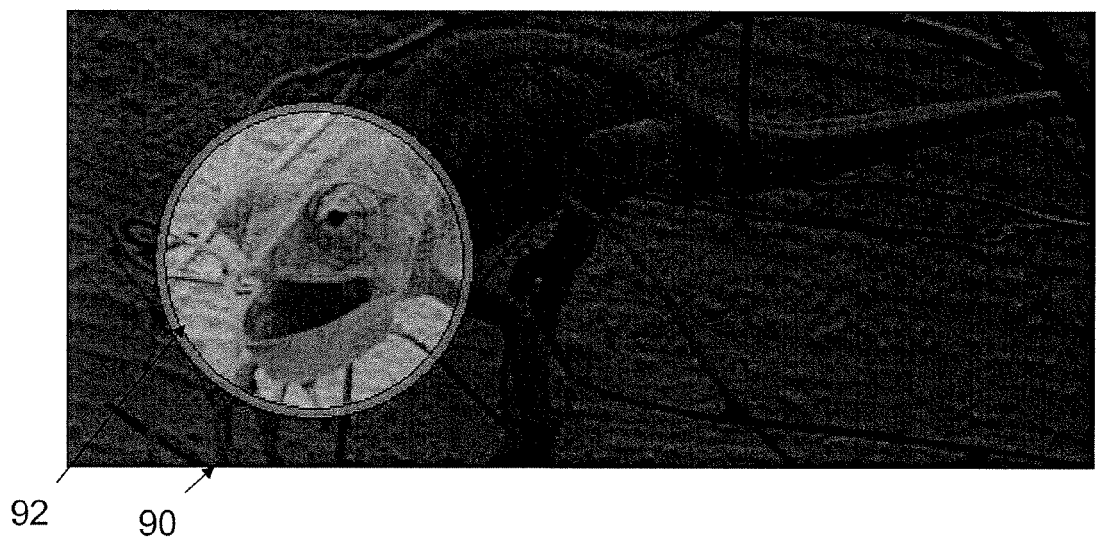
FIG. 16b shows the delineated region of the digital image of FIG. 16a having been spotlighted by application of a spotlighting tool associated with the drawn circular boundary.

A region 92 of different digital image 90 delineated by a circular/elliptical boundary drawn by a user using the touch system 50 is shown in FIG. 16*a*. The identified region 92 of digital image 90 spotlighted by application of a spotlighting tool associated with the gestured circular/elliptical boundary is shown in FIG. 16*b*. The original gesture ink of FIG. 16*a* is automatically removed and, as shown in FIG. 16*b*, is replaced with gesture ink identifying the bounds of the circular/elliptical region 92 that was spotlighted by the spotlighting processing tool.

While a novel method of processing an identified region of a digital image has been described above, it will be understood that many alternatives are available. For example, other figure shapes, such as triangles or trapezoids may be included in the processing tool table in association with respective processing tools.

It will be understood that the gesture shapes stored in the processing tool table previously described are those shapes that serve to directly characterize a region (i.e., clearly identify its size, shape and position), or can be reasonably assumed by implementing software to clearly characterize the region. For example, an ellipse inherently encloses a region thereby fully characterizing the region, whereas a "C" shape does not inherently characterize a region but may be considered by the implementing software to be a similarly-sized ellipse that has been incompletely drawn. The implementing software would then consider the "C" shape to characterize a region that would have been enclosed by a similarly-sized ellipse, and the "C" and ellipse would, for the purpose of processing tool selection, be the same gesture and therefore result in selection of the same processing tool.

According to another embodiment, the processing tool table is configured such that both a "C" and an ellipse "O", while characterizing the same region (in terms of shape, size and position), respectively cause the selection of a different processing tool for processing the region. For example, drawing a "C" shape causes an elliptical region to be spotlighted, whereas drawing an actual ellipse "O" causes the elliptical region to be cropped. Other gestures that do not directly characterize regions, but can be respectively associated with a closed figure and specify its size and position, are supported. For example, a "+" sign gesture in this embodiment characterizes a similarly-sized rectangular region as would an actual rectangular gesture surrounding the region, but causes the selection of a different processing tool than the drawing of a rectangle. The "+" sign gesture could alternatively characterize a similarly-sized elliptical region. Therefore, it can be seen that the shape, size and position of a particular region may be characterized using several different gesture shapes, whereby the actual gesture shape is the key into the index of the processing tool table. An example of the conceptual contents of such an alternative processing table is shown in Table 2 below.

TABLE 2

| Gesture | Region Shape, Size and Position | Processing Action |
| --- | --- | --- |
| "+" | "O" shaped region defined by size and position of "+" gesture | Crop region |
| "O" | "O" shaped region defined by size and position of "O" gesture | Zoom in/out of region |
| "□" | "□" shaped region defined by size and position of "□" gesture | Zoom in/out of region |
| "Γ" | "□" shaped region defined by size and position of "Γ" gesture | Highlight region |

According to the contents of Table 2, if a "+" is drawn by a user, it signifies that an "O", or elliptical-shaped region corresponding in size and position to the drawn "+" is to be processed using the Crop processing tool. However, if an "O" is drawn by the user, it signifies that the same elliptical-shaped region corresponding in size and position to the drawn "O" is to be processed, but this time using the Zoom in/out processing tool.

According to another embodiment, gesture shapes drawn using dashed lines invoke a different processing tool than gesture shapes of the same size and position drawn using a solid line. An example of the conceptual contents of such an alternative processing table is shown in Table 3 below.

TABLE 3

| Gesture | Region Shape, Size and Position | Processing Action |
| --- | --- | --- |
| Dashed "O" | "O" shaped region defined by size and position of dashed "O" gesture | Crop region |
| Solid "O" | "O" shaped region defined by size and position of solid "O" gesture | Zoom in/out of region |
| Solid "+" | "O" shaped region defined by size and position of solid "+" gesture | Highlight region |
| Dashed "□" | "□" shaped region defined by size and position of dashed "□" gesture | Crop region |
| Solid "□" | "□" shaped region defined by size and position of solid "□" gesture | Zoom in/out of region |
| Solid "Γ" | "□" shaped region defined by size and position of solid "Γ" gesture | Highlight Region |

Alternatively, the dashed lines differentiate between region shapes, size and position but invoke the same tool. For example, a dashed "+" is used to identify a circle and a cropping processing action, whereas a solid "+" is used to identify a square and the cropping processing action. Other alternatives will be apparent to those of skill in the art. For example, in some embodiments the determined gesture shape can be dependent on the orientation of the sampled points.

According to another embodiment, a special gesture pen may be used for drawing gesture shapes on the touch screen and launching corresponding processing tools/applications, whereas other pens are used simply for drawing.

It can be seen that the above described method for processing a region of a digital image advantageously allows a user to both select a region and a tool for operating on the region with a single gesture.

Although particular embodiments have been described above, those of skill in the art will appreciate that variations and modifications may be made without departing from the spirit and scope thereof as defined by the appended claims.

What is claimed is:

1. A method of selecting and processing a sub-region of a digital image, comprising:
   identifying potential region borders based on edge content in the digital image;
   receiving border selection input data;
   making at least temporarily visible for user selection at least a subset of the potential region borders in response to said received border selection input data;
   receiving gesture data selecting a sub-region bounded by ones of user selected visible potential region borders, the gesture data being associated with a processing tool;
   automatically launching the processing tool associated with the gesture data; and
   processing the sub-region using the processing tool.

2. The method of claim 1, wherein the gesture data defines a gesture shape that is a closed figure thereby to characterize the shape, size and location of the sub-region.

3. The method of claim 1, wherein the gesture data defines a gesture shape, the gesture shape associated with a shape of, and defining the size and position of, a closed figure thereby to characterize the sub-region.

4. The method of claim 1, wherein the gesture data defines a gesture shape, the gesture shape being associated with the processing tool.

5. The method of claim 4, wherein the gesture shape is a closed figure.

6. The method of claim 1, wherein the gesture data includes coordinates along the boundaries of the sub-region.

7. The method of claim 1, wherein said automatically launching a processing tool comprises:
   identifying a gesture shape from the gesture data;
   searching a processing tool table to determine a processing tool in the processing tool table associated with the identified gesture shape;
   automatically launching the processing tool; and
   providing the gesture data to the processing tool.

8. The method of claim 7, wherein identifying the gesture shape comprises:
   comparing the gesture data to a plurality of shape templates each representing a unique shape; and
   determining which of the shape templates is the most similar to the sub-region thereby to identify the gesture shape.

9. The method of claim 7, wherein the gesture shape is a rectangle and the processing tool associated with the rectangle in the processing tool table is a zoom tool.

10. The method of claim 7, wherein the gesture shape is an ellipse and the processing tool associated with the ellipse in the processing tool table is a highlight/spotlight tool.

11. The method of claim 1, wherein the processing tool is selected from the group consisting of a zoom tool, a cropping tool, a highlighting tool, and a spotlighting tool.

12. The method of claim 1, wherein processing of the sub-region by the processing tool is controllable by a user.

13. The method of claim 12, wherein the processing tool is a zoom tool and the magnification level of the zoom tool is further controllable by the user.

14. The method of claim 1, wherein said identifying comprises:
   calculating pixel intensity profiles for each row and column of pixels in the digital image; and comparing adjacent ones of the pixel intensity profiles to determine where differences between adjacent pixel intensity profiles exceed a threshold level, thereby establishing row and column positions of the potential region borders.

15. The method of claim 1 wherein the at least a subset of the potential region borders is at least temporarily made visible in response to a pointer being swept thereacross.

16. The method of claim 15 wherein each potential region border is at least temporarily made visible when the pointer is within a threshold distance thereof.

17. A non-transitory computer readable medium embodying a computer program for selecting and processing a sub-region of a digital image, the computer program comprising computer program code, which when executed by processing structure, causes a computing device at least to:
identify potential region borders based on edge content in the digital image;
receive border selection input data;
make at least temporarily visible for user selection at least a subset of the potential region borders in response to said received border selection input data;
receive gesture data selecting a sub-region bounded by ones of user selected visible potential region borders, the gesture data being associated with a processing tool;
automatically launch the processing tool associated with the gesture data; and
process the sub-region using the processing tool.

18. An interactive display system comprising:
a touch screen that defines a touch surface on which a computer-generated image is presented;
a sensor assembly detecting pointer contacts on the touch surface and in response, generating border selection input data and gesture data; and
processing structure configured to
identify potential region borders based on edge content in the computer-generated image,
receive border selection input data,
make at least temporarily visible for user selection at least a subset of the potential region borders in response to said received border selection input data;
receive gesture data selecting a sub-region of the computer-generated image bounded by ones of user selected visible potential region borders, the gesture data being associated with a processing tool;
automatically launch the processing tool associated with the gesture data; and
process the sub-region using the processing tool.

19. The system of claim 18, further comprising:
memory storing a processing tool table associating at least one processing tool with a respective gesture shape;
wherein the processing structure identifies a gesture shape from the gesture data, and selects an associated processing tool from the processing tool table for processing the sub-region.

20. The system of claim 19, wherein the gesture shape is a rectangle and the processing tool associated with the rectangle in the processing tool table is a zoom tool.

21. The system of claim 19, wherein the gesture shape is an ellipse and the processing tool associated with the ellipse in the processing tool table is a highlight/spotlight tool.

22. The system of claim 19, wherein processing of the sub-region by the processing tool is controllable by a user.

23. The system of claim 19, wherein the processing tool is a zoom tool and the magnification level of the zoom tool is further controllable by the user.

24. The system of claim 18, wherein the processing tool is selected from the group consisting of a zoom tool, a cropping tool, a highlighting tool, and a spotlighting tool.

25. The system of claim 18 wherein said processing structure at least temporarily makes visible the at least a subset of the potential region borders in response to a pointer being swept thereacross.

26. The system of claim 25 wherein each potential region border is at least temporarily made visible when the pointer is within a threshold distance thereof.

* * * * *